United States Patent [19]

Lee et al.

[11] Patent Number: 5,933,861
[45] Date of Patent: Aug. 3, 1999

[54] PARALLEL MEMORY DEVICE FOR IMAGE PROCESSING UTILIZING LINEAR TRANSFORMATION

[75] Inventors: Heung Gyu Lee; Jong Won Park; Gil Yoon Kim, all of Daejeon, Rep. of Korea

[73] Assignee: Korea Telecommunication Authority, Seoul, Rep. of Korea

[21] Appl. No.: 08/949,542

[22] Filed: Oct. 14, 1997

Related U.S. Application Data

[63] Continuation of application No. 08/423,005, Apr. 14, 1995, abandoned.

[30] Foreign Application Priority Data

Apr. 14, 1994 [KR] Rep. of Korea ............... 94-7874

[51] Int. Cl.$^6$ ............................................. G06F 15/16
[52] U.S. Cl. .................... 711/218; 711/5; 711/214; 711/217; 345/505; 345/507; 345/575
[58] Field of Search .................. 365/230.01; 370/413; 711/5, 214, 215, 218, 219; 345/505, 507–509, 515

[56] References Cited

U.S. PATENT DOCUMENTS

| | | | |
|---|---|---|---|
| 4,400,768 | 8/1983 | Tomlinson | 395/405 |
| 5,193,126 | 3/1993 | Matsuki | 382/293 |
| 5,440,546 | 8/1995 | Banchini, Jr. et al. | 370/60 |

OTHER PUBLICATIONS

Frailong J.M. "XOR Schemes: A Flexible Data Organization in Parallel Memories", Proceedings of the 1985 international Conference on Parallel Processing Aug. 20–23, 1985, pp. 276–282.

*Primary Examiner*—Eddie P. Chan
*Assistant Examiner*—Than V. Nguyen
*Attorney, Agent, or Firm*—Merchant & Gould, P.C.

[57] ABSTRACT

A parallel memory device for an image processing utilizing a linear transformation, capable of achieving simultaneous access in either of various access forms which uses simple hardware and is capable of achieving a high processing rate and thereby a high circuit efficiency. The parallel memory device includes a plurality of address computation circuit units, each adapted to generate an address of each corresponding one of memory modules on the basis of an access form, reference coordinates and a memory module number of the corresponding memory module, a plurality of memory cells each adapted to receive the address generated from each corresponding one of the address computation circuit units and a read/write signal and execute storage, inputting and outputting of actual data, omega networks each adapted to receive the data from the memory cells associated therewith, to generate appropriate paths for the data such that an actual processing order of the memory modules coincides with a logical order required for a processor, and to output the data via the generated paths, and a shift circuit unit adapted to generate appropriate paths between each omega network and data terminals on the basis of an input indicative of the access form.

10 Claims, 5 Drawing Sheets

PARALLEL MEMORY DEVICE FOR IMAGE PROCESSING UTILIZING LINEAR TRANSFORMATION

This is a continuation of U.S. application Ser. No. 08/423,005, filed Apr. 14, 1995.

BACKGROUND OF THE INVENTION

1. Field of the Invention

The present invention relates to a parallel memory device for image processing utilizing a linear transformation, and more particularly to a parallel memory device capable of processing a large quantity of image data at a high rate and achieving a high efficiency for a realization of hardware.

2. Description of the Prior Art

Generally, a parallel memory device is a memory device adapted to obtain a highly parallel characteristic by appropriately distributing, in a plurality of memory modules, data about a specific matter, which data is known in terms of the access form.

In particular, a parallel memory device for image processing is a memory device adapted to utilize the characteristic that most computations are simultaneously accessible, in various access forms, to a set of image points having a certain geometrical form such as a horizontal line, a vertical line or a block, indtead of the computations being accessible in the unit of a single image point.

In order to construct such a parallel memory device achieving simultaneous access, in various access forms, to image points taking a certain geometrical form, column rotation methods and linear transformation methods both adapted to appropriately arranged memory modules, have been used.

In accordance with the column rotation method, memory modules are arranged on the basis of a value derived by multiplying coordinates of a data matrix by appropriate constants, respectively, adding together values resulting from the multiplication, and then executing a modulo computation, by the number of memory modules, for a value resulting from the addition. For arranging the memory modules so as to enable simultaneous access in various access forms used in image processing, it is required that the number of memory modules is a prime number larger than the number of simultaneously accessible memory modules. To this end, the modulo computation by the prime number should be incorporated in an address computation circuit hardware. As a result, the circuit becomes complex and requires a long data processing time. Consequently, a degradation in the efficiency occurs in real circuits.

In accordance with the linear transformation method, memory modules are arranged on the basis of a value derived by multiplying coordinates of a data matrix, taken in the form of binary vectors, by an appropriate binary transformation matrix and XORing a value resulting from the multiplication. Since all computations are executed using only bit-unit computations such as XOR or AND, the linear transformation method has an advantage of being realizable in a simple address computation circuit, as compared to the column rotation method. In this linear transformation method, however, access in the form of horizontal line, vertical line or two-dimensional block at an optional position is impossible because the method is realized under an assumption that the number of simultaneously accessible image points is the same as the number of memory modules. In other words, this method has a limitation that simultaneous access can be possible for an image point disposed at a specific position.

SUMMARY OF THE INVENTION

Therefore, an object of the invention is to solve the above-mentioned problems encountered in the prior art and, to provide a parallel memory device for image processing utilizing a linear transformation, capable of achieving conflict free simultaneous access at an optional position, achieving a simple realization of hardware, obtaining a high processing rate and achieving a high efficiency by expanding a conventional linear transformation method so as to make the number of memory modules to be twice the number of simultaneously accessible image points.

In accordance with the present invention, this object is accomplished by providing a parallel memory device for image processing which uses a linear transformation, comprising: a plurality of address computation circuit units each adapted to generate an address of each corresponding one of the memory modules on the basis of an access form, reference coordinates and a memory module number of the corresponding memory module; a plurality of memory cells each adapted to receive the address generated by each corresponding one of the address computation circuit units and a read/write signal and execute storage, inputting and outputting of actual data; omega networks each adapted to receive data from the memory cells associated therewith, to generate appropriate paths for the data such that an actual processing order of the memory modules coincides with a logical order required for a processor, and to output the data via the generated paths; and a shift circuit unit adapted to generate appropriate paths between each omega network and data terminals on the basis of an input indicative of the access form.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Let's assume that an image matrix expressed by a two-dimensional matrix I(.,.) with the row size and column size both being W (W is an even number satisfying the condition of $W=2^w$, $w \geq 2$) is given and that each constituting element $I(i,j)$ of the image matrix is an image point. In image processing for displaying a color and a brightness for a position corresponding to a condition of $0 \leq j$ and $j \leq W-1$ in the above image matrix, accessible image points having the form of N (N is an even number satisfying the condition of $N=2^n$, $n \leq w$) ($\sqrt{N} \times \sqrt{N}$) two-dimensional blocks, namely, vertical (N×1) and horizontal (N×1) blocks can be expressed as follows:

in the case of accessible image points having the form of a block (BL) with reference to an optional point $I(i,j)$, $$BL(i,j)=\{I(i+a,j+b) 0 \leq a,b \leq \sqrt{N}-1\}, 0 \leq i,j \leq W-\sqrt{N}-1$$

in the case of accessible image points having the form of a vertical line (VS) with reference to the point $I(i,j)$, $$VS(i,j)=\{I(i+a,j) 0 \leq a \leq N-1\}, 0 \leq i \leq W-N-1, 0 \leq j \leq W-1$$

in the case of accessible image points having the form of a horizontal line (HS) with reference to the point $I(i,j)$, $$HS(i,j)=\{I(i,j+b) 0 \leq b \leq N-1\}, 0 \leq i \leq W-1, 0 \leq j \leq W-N-1$$

Let's assume that for an-optional integer x expressed in the form of binary digits, "$x_{k-1}$" represents a value of the k-th right bit while $x_{k:l}$ ($1 \leq k$) represents an integer constituted by k−l+1 bits expressed by a binary expression of $x_k$ . . . $x_l$. In this connection, it can be assumed that for coordinates i,j of an image point, "$i_{n-1:0}, j_{n-1:0}$" represents a vector constituted by n low-order bits of the image point coordinates i,j. A module allocation function is used to arrange memory modules so as to enable conflict-free, simultaneous access in any of the above-mentioned three kinds of access patterns. Under the above assumption, a module allocation function $\mu$ for an image point $I(i,j)$ in an image matrix can be expressed as follows:

$$\mu(i,j)=\{j_{n/2}, (i_{n-1:0} \oplus (I_{n/2} I_{n/2} j_{n-1:0}))\} I_{n/2} 0_{n/2}$$

where, "{x,y}" represents a connection operator expressed by an equation "$\{x,y\}=x \times 2^{\lceil \log y \rceil}+y$" ("$\lceil x \rceil$" is a smallest integer equal to or higher than x), "$I_{n/2}$" represents an n/2×n/2 identity matrix, and "$0_{n/2}$" represents an n/2×n/2 zero matrix.

On the other hand, an address allocation function, namely, an address of the image point $I(i,j)$ is used to designate an address each memory modules arranged on the basis of the above-mentioned module allocation function so as to enable access to actual memory elements of the memory modules. The address of the image point $I(i,j)$ can be expressed as follows:

$$a(i,j)=\{i_{w-1:n/2+1}, h_{w-1:n/2}\}$$

Figure 1:
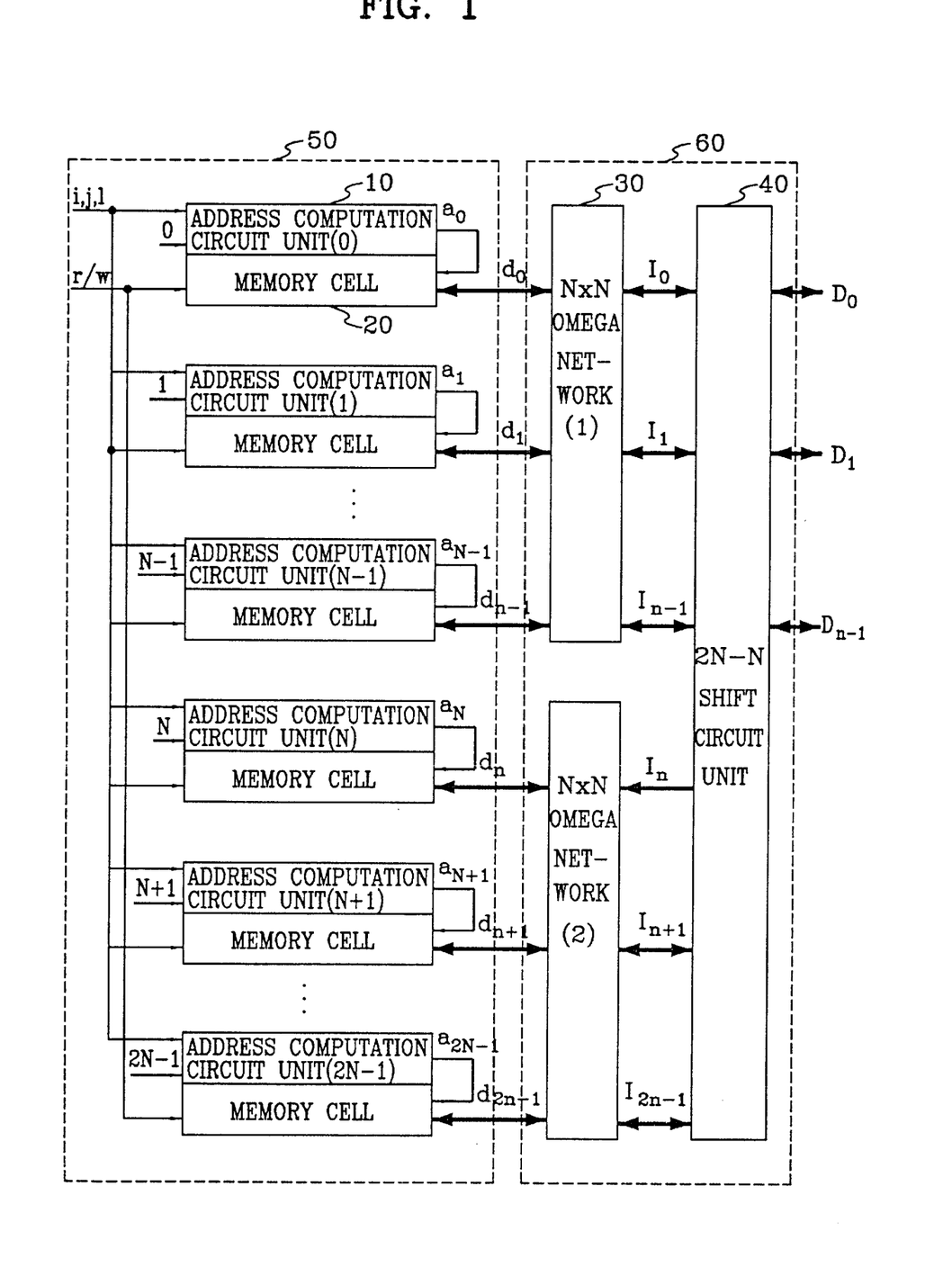
FIG. 1 is a block diagram illustrating a parallel memory device in accordance with the present invention.

Referring to FIG. 1, there is illustrated a parallel memory device utilizing the above-mentioned method in accordance with the present invention. As shown in FIG. 1, the parallel memory device includes a memory module unit 50 constituted by 2N (N is an integer number) of memory modules. Each memory module includes an address computation circuit unit 10 and a memory cell 20. Each address computation circuit unit 10 generates an address $a_i$ of each corresponding memory module on the basis of an access pattern t, reference coordinates $I(i,j)$ and a memory module number associated with the memory module. Each cell 20 $mc_i$ receives the address $a_i$ generated by each associated address computation circuit unit 10 and a read/write signal r/w and executes storage, inputting and outputting of actual data $d_i$. The parallel memory device also includes a re-arrangement circuit unit 60 constituted by N×N omega networks 30 and a shift circuit unit 40. The omega network 30 makes a physical order of the memory module unit 50 coincide with a logical order required for a processor array (not shown in the Figures). The processor array includes N processor elements which receive data from the shift circuit unit 40 and process data in parallel.

Figure 5:
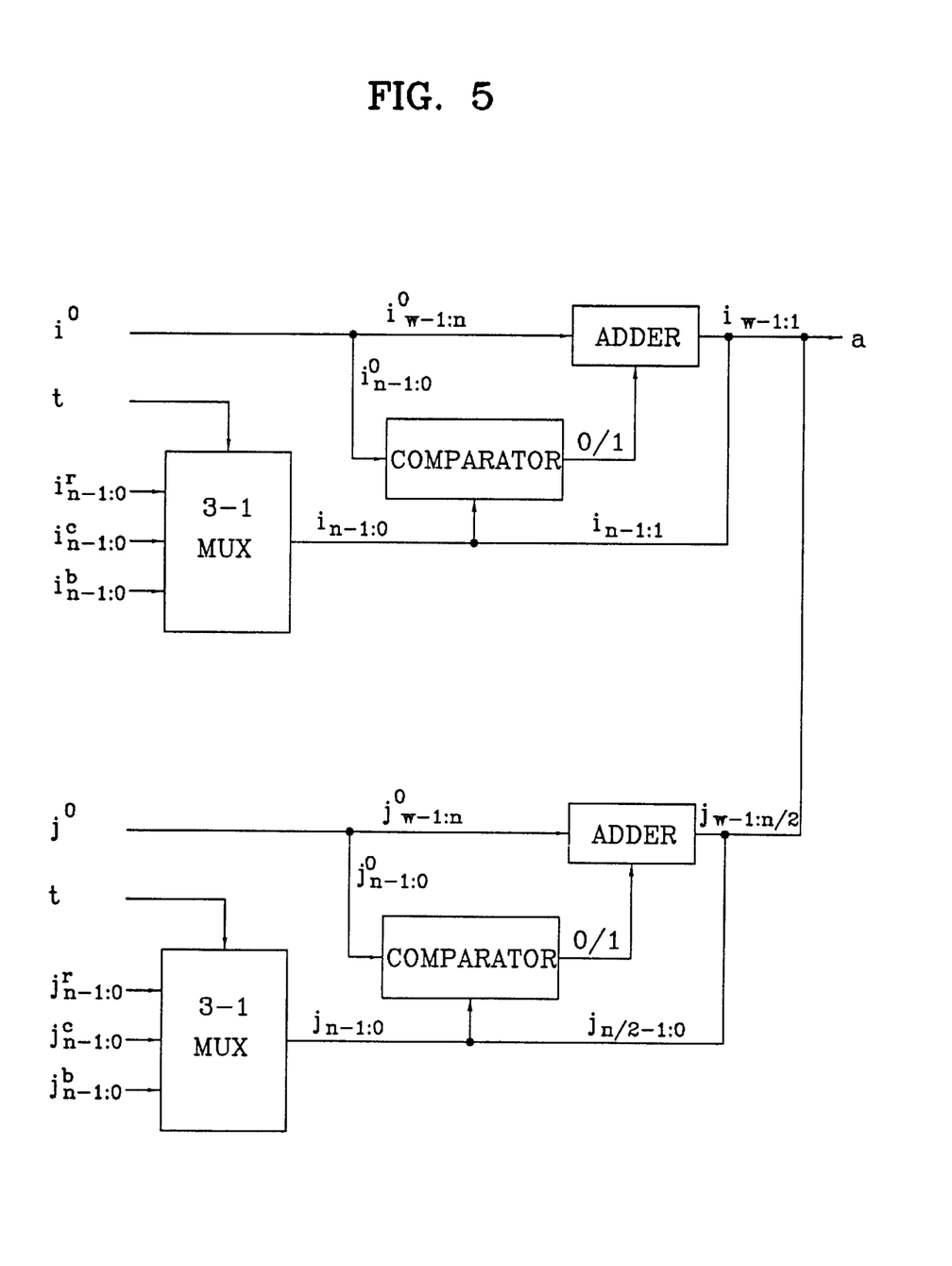
FIG. 5 is a block diagram illustrating an address computation circuit unit for computing final image point coordinates on the basis of the results of FIGS. 2 to 4 in accordance with the present invention.

Each address computation circuit unit 10 includes a multiplexor adapted to receive coordinates of n low-order bits in accesses of the vertical line, horizontal line and block patterns and output one of the received coordinates on the basis of the access pattern, a comparator adapted to compare the output from the multiplexor with a value of the n low-order bits of reference coordinates ($i^0, j^0$), and an adder adapted to add an output from the comparator to the value of n low-order bits of reference coordinates ($i^0, j^0$)

Now, an operation of the parallel memory device having the above-mentioned construction will be described.

Since the address of each memory module is a function of coordinates of each associated image point, the memory module computes the coordinates of the associated image point on the basis of the reference coordinates and access pattern in order to compute its address. That is, the n-th low-order bit of the image point coordinates i,j is first computed on the basis of the number of the memory module, the given reference coordinates and the access pattern. To the value resulted from the above computation, the value of reference coordinates is then added, thereby deriving a complete value of the image point coordinates i,j.

In other words, the coordinates of n low-order bits are expressed, depending on the access pattern, as follows:

in the access of the horizontal line pattern, $$i^r_{n-1:0}=i^0_{n-1:0}$$

$$j^r_{n-1:0}=Q^{-1}(i^0_{n-1:0} \oplus s_{n-1:0})$$

in the access of the vertical line pattern, $$j^c_{n-1:0}=j^0_{n-1:0}$$

$$i^c_{n-1:0}=s_{n-1:0} \oplus Q^{-1} j^0_{n-1:0}$$

in the access of the block pattern, $$i^b_{n-1:n/2}=i^0_{n-1:n/2}+(i^b_{n/2} \oplus s_n)$$

$$j^b_{n/2-1:0}=i^b_{n-1:n/2} \oplus s_{n-1:n/2}$$

$$j^b_{n-1:n/2}=j^0_{n-1:n/2}+LT(j^b_{n/2-1:0}, j^0_{n/2-1:0})$$

$$i^b_{n/2-1:0}=j^b_{n/2-1:0} \oplus j^b_{n-1:n/2} \oplus s_{n/2-1:0}$$

where, "$i^0, j^0$" represent the coordinates of a reference point, "s" represents a memory-module number, and "LT(x,y)" represents a Boolean "less than" function (namely, LT(x,y)=1 if x<y and LT(x,y)=0 if $x \geq y$). Also, "Q" represents the following matrix while "$Q^{-1}$" is an inverse matrix of Q.

$$Q=I_{n/2} I_{n/2}$$

$$I_{n/2} 0_{n/2}$$

Figure 2:
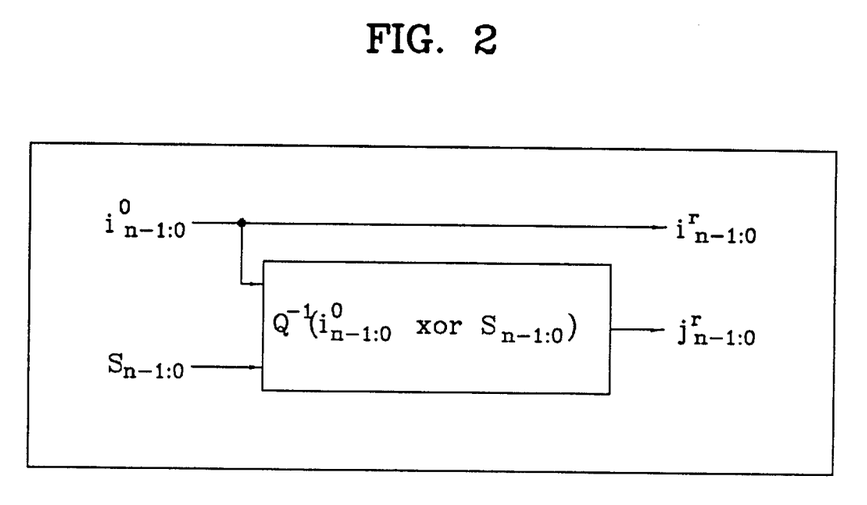
FIG. 2 is a block diagram illustrating an address computation circuit unit for computing a value of n lower bits of image point coordinates in an access of a horizontal line form in accordance with the present invention.
Figure 3:
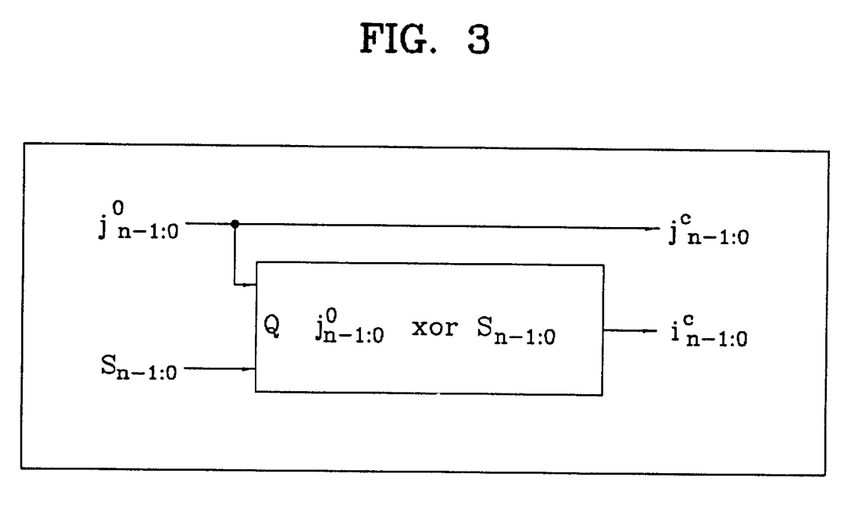
FIG. 3 is a block diagram illustrating an address computation circuit unit for computing a value of n lower bits of image point coordinates in an access of a vertical line form in accordance with the present invention.
Figure 4:
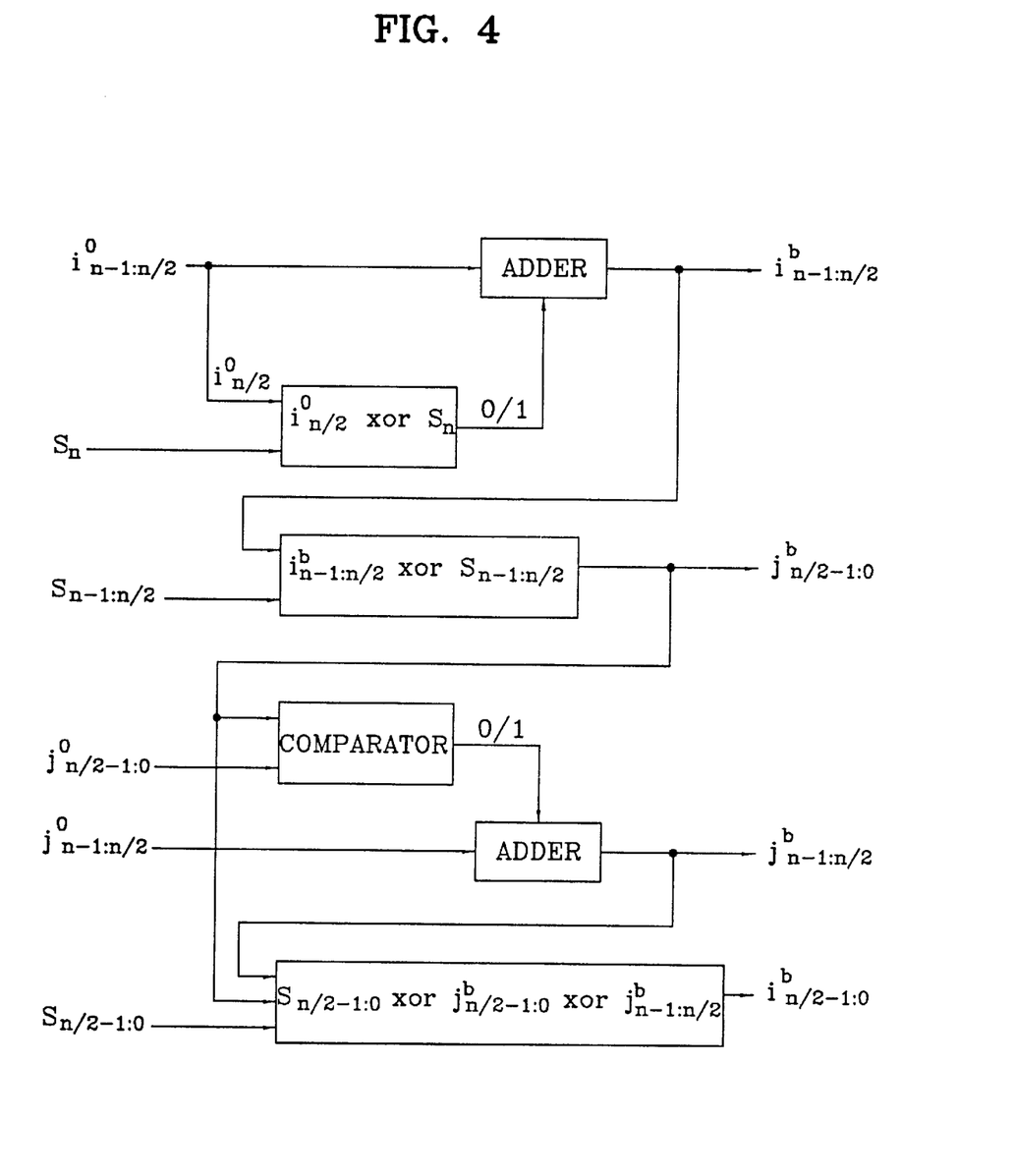
FIG. 4 is a block diagram illustrating an address computation circuit unit for computing a value of n lower bits of image point coordinates in an access of a block form in accordance with the present invention.

FIGS. 2 to 4 illustrate various address computation circuit units for computing the value of n low-order bits of the image point coordinates depending on the access pattern, respectively.

The value of n low-order bits derived in the above-mentioned manner is compared with the value of n low-order bits of the image point coordinates $i^0$, $j^0$. Thereafter, a value of the remaining-high-order bits is then derived using the following equations:

$$i_{w-1:n} = i^0_{w-1:n} + LT(i_{n-1:0}, i^0_{n-1:0})$$

$$j_{w-1:n} = j^0_{w-1:n} + LT(j_{n-1:0}, j^0_{n-1:0})$$

Each address computation circuit unit 10 computing the address of each memory module on the basis of the access pattern, reference coordinates and memory module number is illustrated in FIG. 5.

In order to make the physical order of memory modules based on the addresses computed by the address computation units 10 coincide with the logical order required for the processor, the order of data vectors is inverted through the omega networks 30 and shift circuit unit 40 so that the data vectors can pass through the omega networks in an access in either of the horizontal line form and the block form.

In other words, the shift circuit unit utilizes a shift function expressed as follows:

in an access in either of the horizontal line form and the block form, $$I^0_k = D_k, \ 0 \leq k \leq N-1, \ \text{if} \ i_{n/2}=0$$

$$I^1_k = D_{\bar{k}}, \ 0 \leq k \leq N-1, \ \text{if} \ i_{n/2}=1$$

in an access in the vertical line form, $$I^0_k = D_k, \ 0 \leq k \leq N-1, \ \text{if} \ i_{n/2}=0$$

$$I^1_k = D_{\bar{k}}, \ 0 \leq k \leq N-1, \ \text{if} \ i_{n/2}=1$$

where, "D" represents a data vector in the side of the processor, "$I^0$, $I^1$" represent data vectors in the side of respective omega networks, and "$k^5$" represents an inversion of k, namely, an inversion between n/2 high-order bits and n/2 low-order bits in k.

Figure 6:
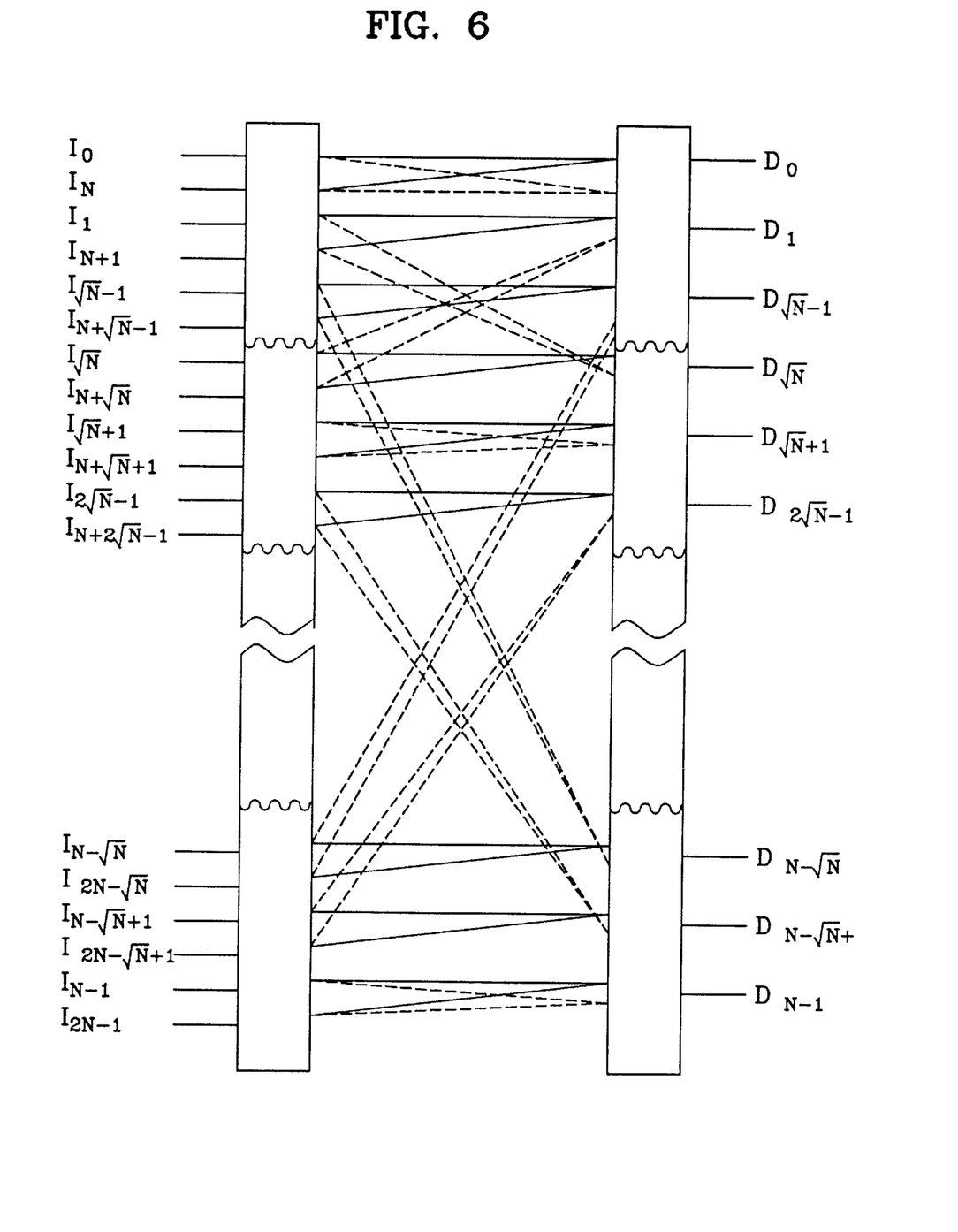
FIG. 6 is a block diagram illustrating a shift circuit unit constituting a part of the parallel memory device shown in FIG. 1.

Such a shift circuit unit is illustrated in FIG. 6.

Meanwhile, N×N omega networks 30 can be constructed by modifying switches of general omega networks such that they can operate even when a part of inputs thereof are used.

As is apparent from the above description, the present invention provides effects of enabling conflict-free simultaneous access in any of a number of access patterns and yet using a simple hardware. The present invention also provides effects of achieving a high processing rate and thereby a high efficiency for a realization of hardware.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A parallel memory device for image processing utilizing a linear transformation for use with a parallel processor array having a given number of processor elements, comprising:

address computation circuit units, whose number is twice said given number of said processor elements, each adapted to generate an address of each memory module in response to an access pattern of memory modules, reference coordinates and memory module numbers of the corresponding memory module, wherein coordinates of n low-order bits of each address computation circuit unit are expressed, in a horizontal line form, as:

$$i'_{n-1:0} = i^0_{n-1:0}$$

$$j'_{n-1:0} = Q^{-1}(i^0_{n-1:0} \oplus s_{n-1:0})$$

where, "$i^0, j^0$" represent reference coordinates, respectively, "s" represents a memory module number, and "$Q^{-1}$" is an inverse matrix of matrix Q where $$Q = I_{n/2} I_{n/2}$$

$$I_{n/2} O_{n/2}$$

and $I_{n/2}$ is an n/2×n/2 identity matrix and $O_{n/2}$ is an n/2×n/2 zero matrix;

memory cells whose number is twice said given number of said processor elements, each adapted to receive the address generated by each corresponding address computation circuit unit and to receive a read/write signal and to store, input and output data; and means for simultaneously generating data paths between said processor elements and said memory modules in accordance with said access pattern.

2. The parallel memory device in accordance with claim 1, wherein coordinates of n lower-order bits of each address computation circuit unit are expressed, in an access of a vertical line form, as:

$$j^c_{n-1:0} = j^0_{n-1:0}$$

$$i^c_{n-1:0} = s_{n-1:0} \oplus Q^{-1} j^0_{n-1:0}$$

where, "$i^0$, $j^0$" represent reference coordinates, respectively, "s" represents a memory module number, and "Q" is given by:

$$Q = I_{n/2} I_{n/2}$$

$$I_{n/2} O_{n/2}$$

where $I_{n/2}$ is an n/2×n/2 identity matrix and $O_{n/2}$ is an n/2×n/2 zero matrix.

3. The parallel memory device in accordance with claim 2, wherein coordinates of n low-order bits of each address computation circuit unit are expressed, in an access of a block form, as follows:

$$i^b_{n-1:n/2} = i^0_{n-1:n/2} + (i^b_{n/2} \oplus s_n)$$

$$j^b_{n/2-1:0} = i^b_{n-1:n/2} \oplus s_{n-1:n/2}$$

$$j^b_{n-1:n/2} = j^0_{n-1:n/2} + LT(j^b_{n/2-1:0}, j^0_{n/2-1:0})$$

$$i^b_{n/2-1:0} = j^0_{n/2-1:0} \oplus j^b_{n-1:n/2} \oplus s_{n/2-1:0}$$

where, "$i^0, j^0$" represent reference coordinates, respectively, "s" represents a memory module number, and "LT(x,y)" represents a Boolean "less than" function, where LT(x,y)=1 if x<y and LT(x,y)=0 if x≥y.

4. A parallel memory device in accordance with claim 3, wherein said means for simultaneously generating data paths comprises omega networks for transferring data; and a shift circuit unit, coupled between said omega networks and processor elements, for transferring data without collision in said omega networks.

5. The parallel memory device in accordance with claim 3, wherein each address computation circuit unit comprises:

a multiplexor adapted to receive coordinates of n low-order bits in access of vertical line, horizontal line and block forms and to output one of the received coordinates in response to the access form;

a comparator adapted to compare the output from the multiplexor with a value of the n low-order bits of reference coordinates ($i^0, j^0$); and an adder adapted to add an output from the comparator to the value of n low-order bits of reference coordinates ($i^0, j^0$).

6. A parallel memory device in accordance with claim 1, wherein said means for simultaneously generating data paths comprises omega networks for transferring data; and a shift circuit unit, coupled between said omega networks and processor elements, for transferring data without collision in said omega networks.

7. The parallel memory device in accordance with claim 6, wherein the shift circuit unit generates appropriate paths between omega networks and data terminals in an access in either one of a horizontal line form and a block form through the shift function:

$$I^0_k = D_k, 0 \leq k \leq N-1, \text{if } i_{n/2}=0$$

$$I^1_{k'} = D_k, 0 \leq k \leq N-1, \text{if } i_{n/2}=1$$

where, "D" represents a data vector in the processor, "$I^0$, $I^1$" represent data vectors in respective omega networks and "$k'$" represents an inversion of k, which is an inversion between n/2 high-order bits and n/2 low-order bits in k.

8. The parallel memory device in accordance with claim 6, wherein the shift circuit unit generates appropriate paths between omega networks and data terminals in an access in the vertical line form through the shift function:

$$I^0_k = D_k, 0 \leq k \leq N-1, \text{ if } i_{n/2}=0$$

$$I^1_k = D_k, 0 \leq k \leq N-1, \text{ if } i_{n/2}=1$$

where, "D" represents a data vector in the processor, and "$I^0$, $I^1$" represent data vectors in the side of respective omega networks.

9. A parallel memory device for image processing utilizing a linear transformation for use with a parallel processor array having a given number of processor elements, comprising:

address computation circuit units, whose number is twice said given number of said processor elements, each adapted to generate an address of each memory module in response to an access pattern of memory modules, reference coordinates and memory module numbers of the corresponding memory module, wherein coordinates of n lower-order bits of each address computation circuit unit are expressed, in an access of a vertical line form, as:

$$j^c_{n-1:0} = i^0_{n-1:0}$$

$$i^c_{n-1:0} = s_{n-1:0} \oplus Q^{-1} j^0_{n-1:0}$$

where, "$i^0$, $j^0$" represent reference coordinates, respectively, "s" represents a memory module number, and "Q" is given by:

$$Q = \begin{matrix} I_{n/2} & I_{n/2} \\ I_{n/2} & O_{n/2} \end{matrix}$$

where $I_{n/2}$ is an n/2×n/2 identity matrix and $O_{n/2}$ is an n/2×n/2 zero matrix;

memory cells whose number is twice said given number of said processor elements, each adapted to receive the address generated by each corresponding address computation circuit unit and to receive a read/write signal and to store, input and output data; and means for simultaneously generating data paths between said processor elements and said memory modules in accordance with said access pattern.

10. A parallel memory device for image processing utilizing a linear transformation for use with a parallel processor array having a given number of processor elements, comprising:

address computation circuit units, whose number is twice said given number of said processor elements, each adapted to generate an address of each memory module in response to an access pattern of memory modules, reference coordinates and memory module numbers of the corresponding memory module, wherein coordinates of n low-order bits of each address computation circuit unit are expressed, in an access of a block form, as follows:

$$i^b_{n-1:n/2} = i^0_{n-1:n/2} + (i^b_{n/2} \oplus s_n)$$

$$j^b_{n/2-1:0} = i^b_{n-1:n/2} \oplus s_{n-1:n/2}$$

$$j^b_{n-1:n/2} = j^0_{n-1:n/2} + LT(j^b_{n/2-1:0}, j^0_{n/2-1:0})$$

$$i^b_{n/2-1:0} = j^0_{n/2-1:0} \oplus j^b_{n-1:n/2} \oplus s_{n/2-1:0}$$

where, "$i^0$, $j^0$" represent reference coordinates, respectively, "s" represents a memory module number, and "LT(x,y)" represents a Boolean "less than" function, where LT(x,y)=1 if x<y and LT(x,y)=0 if x≧y;

memory cells whose number is twice said given number of said processor elements, each adapted to receive the address generated by each corresponding address computation circuit unit and to receive a read/write signal and to store, input and output data; and means for simultaneously generating data paths between said processor elements and said memory modules in accordance with said access pattern.

* * * * *

UNITED STATES PATENT AND TRADEMARK OFFICE
CERTIFICATE OF CORRECTION

PATENT NO. : 5,933,861
DATED : AUGUST 3, 1999
INVENTOR(S) : LEE ET AL.

It is certified that error appears in the above-identified patent and that said Letters Patent is hereby corrected as shown below:

Front page, [30] Foreign Application Priority Data: "94-" should read --1994- --

Col. 1, line 27: "indtead" should read --instead--

Col. 2, line 6: delete "," after the word "and"

Col. 3, line 8: "$(\sqrt{N} \times \sqrt{N})$" should read --$(\sqrt{N} \times \sqrt{N})$--

Col. 3, line 13 (2 occurrences): "$\sqrt{N}-1$" should read --$\sqrt{N-1}$--

Col. 3, line 49: "modules" should read --module--

Col. 4, line 16: insert --$t$,-- after the word "pattern"

Col. 4, line 51 (2 occurrences): "n 1:n/2" should read --n-1:n/2--

Col. 4, line 51 (2 occurrences): "n/2 1:0" should read --n/2-1:0--

Col. 5, line 10: "cach" should read --each--

UNITED STATES PATENT AND TRADEMARK OFFICE
CERTIFICATE OF CORRECTION

PATENT NO. : 5,933,861
DATED : AUGUST 3, 1999
INVENTOR(S) : LEE ET AL.

It is certified that error appears in the above-identified patent and that said Letters Patent is hereby corrected as shown below:

Col. 6, line 29, claim 2: "$i^c{}_{n-1:0} = S_{n-1:0} \oplus Q\ ^1j^0{}_{n-1:0}$" should read -- $i^c{}_{n-1:0} = S_{n-1:0} \oplus Q^{-1} j^0{}_{n-1:0}$ --

Col. 8, line 1, claim 9: "$j^c{}_{n-1:0} = i^0{}_{n-1:0}$" should read -- $j^c{}_{n-1:0} = j^0{}_{n-1:0}$ --

Signed and Sealed this

Tenth Day of April, 2001

Attest:

NICHOLAS P. GODICI

*Attesting Officer*   *Acting Director of the United States Patent and Trademark Office*